July 13, 1937.   W. J. ARMSTRONG   2,086,659
POWER TRANSMISSION MEANS
Filed Jan. 9, 1932   2 Sheets-Sheet 1

INVENTOR
Walter J. Armstrong
BY
ATT'YS

July 13, 1937.      W. J. ARMSTRONG           2,086,659
                POWER TRANSMISSION MEANS
                  Filed Jan. 9, 1932        2 Sheets-Sheet 2

INVENTOR
Walter J. Armstrong
BY
Cushman Bryant Darby Cushman
ATT'YS.

UNITED STATES PATENT OFFICE 2,086,659

POWER TRANSMISSION MEANS

Walter J. Armstrong, Columbus, Ohio, assignor to The Jeffrey Manufacturing Company, a corporation of Ohio Application January 9, 1932, Serial No. 585,788

10 Claims. (Cl. 83—12)

The present invention relates to power transmission means and particularly to such means designed for the drive of a plurality of shafts extending side by side and relatively movable to vary the distance between them. Such a drive finds particular application in crushers of the plural roll type, wherein one of the rolls is movable toward and away from the other, and accordingly the invention will be described in connection with such a machine.

Heretofore, in effecting the roll drive of plural roll crushers by means of a single motor, the two rolls have been customarily interconnected by means of spur gears. Under these circumstances only a small relative movement of the rolls is permissible, since the meshing of the gears must be maintained. Relatively long toothed gears of special design have been utilized in order to secure the greatest possible range of movement, but these gears have been inefficient in operation and even with them the range of the machine has been inconveniently restricted.

According to the present invention the rolls are provided with pulleys engaged by an endless strand in such a manner as to secure the proper direction of roll rotation and to permit a wide range of relative displaceability. The new arrangement carries with it a considerable number of advantages which will be referred to hereinafter in describing one embodiment of the invention as shown in the accompanying drawings.

Figure 1:
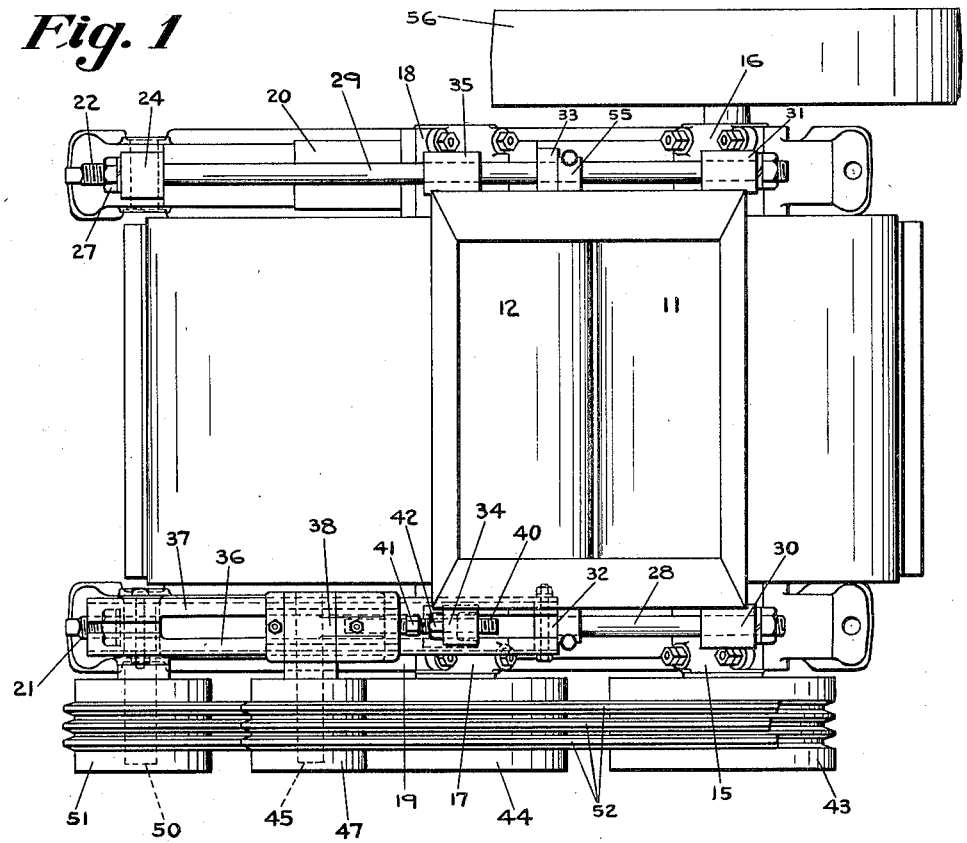
Figure 1 is a plan view of a double roll crusher to which my improved drive has been applied.

Referring to the drawings, reference numeral 10 designates generally a frame in which are journaled a pair of rolls 11 and 12 on shafts 13 and 14. While the elements 13 and 14 may be through shafts, they may, of course, be constituted by studs integral with the rolls. The rolls 11 and 12, which constitute abutment and pressure rolls respectively, are shown as being smooth, but if desired, they may be provided with teeth in the well known manner.

Shaft 13 is journaled in fixed bearings 15 and 16, while shaft 14 is journaled in bearings or blocks 17 and 18 which are slidable on horizontal tracks 19 and 20 presented by the machine frame. While bearings 15 and 16 are stated as being "fixed", this does not, of course, preclude the provision of means for effecting necessary adjustment thereof. The blocks 17 and 18 have secured thereto rods 21 and 22, which extend through openings formed in frame uprights 23 and 24, the rods being provided inwardly of the uprights with fixed abutment collars as at 25, Figures 2 and 3, between which and the uprights are engaged powerful compression springs as at 26, the free ends of the rods being threaded and engaged by nuts, as at 27, outwardly of the uprights. By adjusting the nuts, it will be obvious that the journal blocks 17 and 18 can be moved along their tracks to vary the distance between rolls 11 and 12. By tightening the nuts, roll 12 is moved away from roll 11 against the force of the springs, while upon loosening the nuts, the springs move roll 12 toward roll 11. In any adjusted position the springs permit movement of roll 12 away from roll 11 so as to pass large unpulverable fragments and thus save the machine from shock.

Tie bars or rods 28 and 29 extend from end to end of the machine in vertically spaced parallel relation to tracks 19 and 20, the bars being supported at one end in bores in the upper ends of uprights 23 and 24, at the other ends in similar uprights 30 and 31, and at intermediate portions in bores of frame members 32 and 33. Blocks 17 and 18 have upwardly extending portions or arms 34 and 35 provided with bores which slidably engage bars 28 and 29 to assist in guiding the journal blocks. The tracks and rods constitute vertically spaced slide bearings. Portion 34 differs from portion 35 in projecting a greater distance above its associated bar 28.

Supported on frame members 23 and 32 are a pair of angle bars 36 and 37, the bars being arranged with web portions in the same horizontal plane parallel to the track 19 and spaced somewhat from each other. The upper end of arm 34 projects between the angle bars for sliding movement relative thereto. The vertical webs of the angle bars are bolted rigidly to the frame members 23 and 32.

Figure 4:
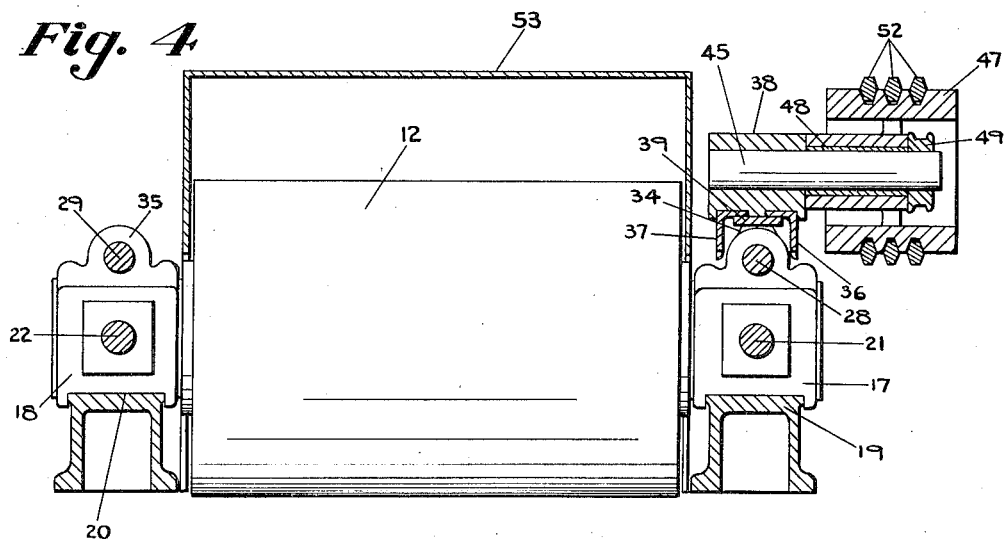
Figure 4 is a section substantially on the line 4—4 of Figure 2.

A support or carriage 38 (Fig. 4) in the nature of a block is grooved for engagement with bars 36 and 37, and is secured against disengagement with the bars by means of a cleat 39 secured thereto and underlying the adjacent lower margins of the horizontal webs of the bars, the proportion of parts being such that the support 38 has a free sliding engagement with the bars.

The end of support 38 adjacent arm 34 is in the nature of an open-sided frame in a threaded bore in the end wall of which is engaged one end of a threaded rod 40, the other end of the rod being oppositely threaded and engaged in a threaded bore in the upper end of arm 34. Rod 40 is provided with a central squared portion 41 which may be engaged by a wrench to rotate the rod and thereby adjust support 38 toward or away from arm 34. A lock nut 42 holds the rod in adjusted position.

Shafts 13 and 14 have secured thereto pulleys 43 and 44 on the same side of the machine as support 38. The latter is provided with a bore parallel to shafts 13 and 14, in which is engaged a stud shaft 45 and secured by means of a cap screw 46. A take-up and direction pulley 47 is rotatably supported on the stud shaft through the intermediary of a bushing 48 and held against movement off the free end of the shaft by means of an abutment collar 49. On a stud shaft 50 parallel to shaft 45 and supported in a bore of the frame below upright 23 is rotatably mounted a direction pulley 51.

As here shown, all of the pulleys are provided with a plurality of grooves for the reception of reversible endless V-belts 52, these belts engaging the side of pulley 43 remote from the pair of pulleys 47 and 51, the other end of the belt engaging the last-named pulleys and being looped back between them to engage the remote side of pulley 44. Suitable tension is obtained by properly adjusting the connecting rod 40.

Figure 2:
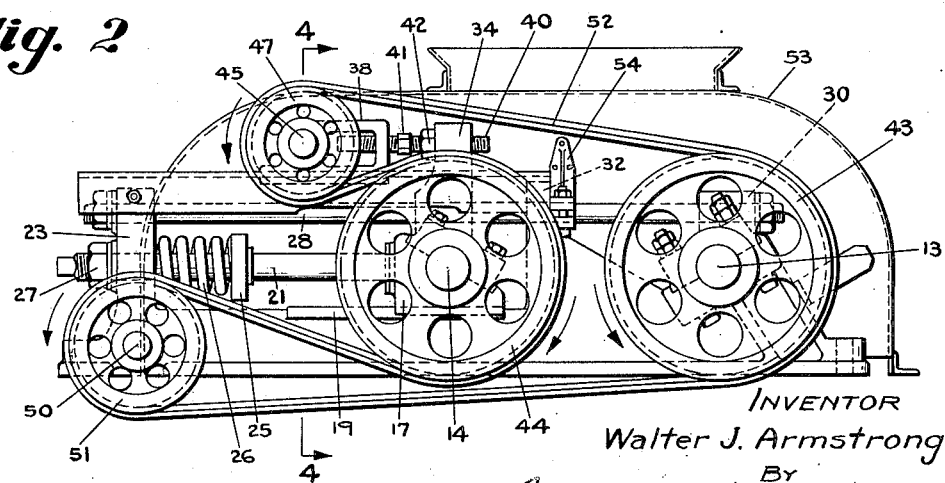
Figure 2 is an elevation of the machine of Figure 1.
Figure 3:
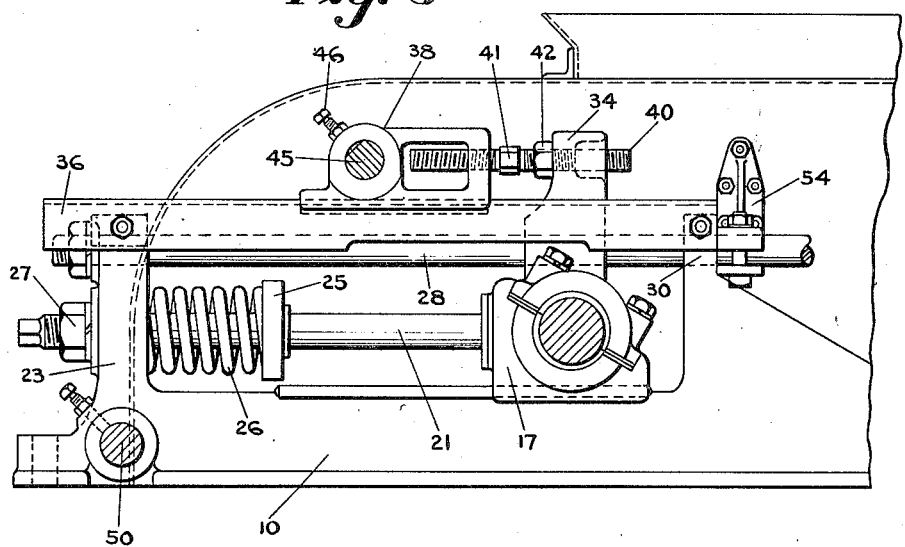
Figure 3 is an enlarged elevation of a portion of the machine, as in Figure 2, but with parts in section and others removed to show details of construction.

With the described arrangement, it will be evident that rotation of shaft 13 in the direction of the right hand arrow, Figure 2, will cause shaft 14 to rotate in the direction of the left hand arrow, it being necessary in the operation of the machine that the top portions of the rolls move toward each other. It will be evident that due to the connection between journal block 17 and support 38, the latter will participate in parallel relation in all sliding movements of the former so that the original tension of the belts will be retained no matter what the spacing of roll 12 from roll 11.

The endless belts 52 may be conceived of as each comprising a triple loop formation of which an inner loop portion, engaging pulley 44, lies between outer loop portions, engaging pulleys 47 and 51, in reverse relation thereto. The pulley engaged in the inner loop portion and one of the other pulleys have rectilinear lines of movement extending substantially centrally of their associated loops with the sections of each loop relatively close together and preferably spaced apart no further than the diameter of the associated pulley.

The adjustment range of blocks 17 and 18 may be as great as desired, and it will be evident that the frame 10 is not confined to use with rolls of any particular size. Consequently, frame 10 may be made in a single size and rolls of various sizes associated therewith as required, a uniform belt length sufficing, since varying spacings of roll centers are automatically accommodated. While I have shown a V-belt drive, the invention is not restricted in this respect as a flat belt could be used and for that matter a chain and sprockets might be substituted without departure from the invention. Also, pulleys of various diameters may be used so that differential roll speeds may be obtained. An endless strand drive, as disclosed, can be operated at a speed much greater than the conventional gear drive, so that the capacity of the machine is considerably increased.

It will be noted that the direction pulleys 47 and 51 are relatively close together and they may be as close as possible while maintaining clearance between the outer runs of the belts and pulley 44. The sections of the loops which engage pulleys 44 and 47 are relatively close together, the sections of each loop, as here shown, being convergent. Preferably the sections of each loop are spaced apart a distance not greater than the diameter of the associated pulley. Furthermore, these loops are similar in form and are substantially symmetrical with respect to horizontal planes passed through the respective pulley axes, the pulleys being movable in these planes. This arrangement is very effective in securing proper compensatory adjustments of the belt.

Since the direction pulleys are spaced away from the crushing zone in the longitudinal direction of the apparatus they offer no obstruction to feed from either side of the machine.

An important advantage of the invention is that the belts have extended engagement with the roll pulleys. The belts engage pulley 43 throughout an arc of substantially 180° and pulley 44 is engaged throughout an arc in excess of 240°. Positive drive is thus assured.

I have shown an upper casing element 53 defining a feed opening and held in position through brackets 54 and 55, this being, of course, a detail of construction immaterial as regards the invention, and while it is more or less immaterial where the power input is made, I have shown in Figure 1 a belt pulley 56 fixed on shaft 13 for drive from any suitable prime mover.

It will be understood that while I have described a practical embodiment of the invention in detail, the invention is not limited to the precise structure disclosed. Various changes may be made without departure from the invention as defined in the following claims.

I claim:

1. Apparatus comprising a supporting frame, a pair of rotatable crusher or like rolls journaled on said frame, one of said rolls being rotatable on an axis fixed relative to the frame and the other being bodily movable toward and away from the first, pulleys fixed to said rolls respectively, a pair of vertically spaced direction pulleys on that side of the movable roll remote from the first roll, one of said direction pulleys being rotatable on an axis fixed relative to said frame and the other being mounted for bodily movement in a direction parallel to the direction of movement of said movable roll, means for transmitting the movement of said movable roll to said movable direction pulley, an endless belt associated with all of said pulleys to drive the rolls in opposite directions, said direction pulleys engaging loops of said belt extending from a loop in which the pulley associated with said movable roll is engaged, and means urging the movable roll toward the other, the loops in which the movable direction pulley and the pulley associated with the movable roll are engaged each having its sections relatively close together and directed generally in the direction of movement of the engaged pulleys.

2. Apparatus comprising a supporting frame, a pair of rotatable crusher or like rolls journalled on said frame, one of said rolls being journalled for bodily movement relative to the other, an endless belt for driving said rolls in opposite direction, a portion of said belt having a triple loop formation in which an inner loop portion lies between outer loop portions in reverse relation to the latter, direction pulleys engaged in the outer loop portions and a pulley engaged in the inner loop portion, means for bodily moving the last-named pulley in accordance with bodily movements of the movable roll, one of said direction pulleys having a positionally fixed axis of rotation and the other being movable in a direction parallel to the direction of movement of and in dependence upon the movement of the pulley engaged in said inner loop portion whereby to maintain an existing belt tension, said movable pulleys having rectilinear lines of movement extending substantially centrally of their associated loops.

3. Apparatus comprising a supporting frame, a pair of rotatable crusher or like rolls journalled on said frame, one of said rolls being journalled for bodily movement relative to the other, an endless belt for driving said rolls in opposite direction, a portion of said belt having a triple loop formation in which an inner loop portion lies between outer loop portions in reverse relation to the latter, direction pulleys engaged in the outer loop portions and a pulley engaged in the inner loop portion, means for bodily moving the last-named pulley in accordance with bodily movements of the movable roll, one of said direction pulleys having a positionally fixed axis of rotation and the other being movable in a direction parallel to the direction of movement of and in dependence upon the movement of the pulley engaged in said inner loop portion whereby to maintain an existing belt tension, said movable pulleys having rectilinear lines of movement extending substantially centrally of their associated loops, and the respective sections of all the loops being spaced apart a distance not greater than the diameter of their respective associated pulleys.

4. Apparatus comprising a pair of parallel shafts, pressure or like rolls mounted on said shafts respectively and between which material is adapted to be passed for treatment, fixed journal means for one of said shafts, journal means for the other of said shafts movable substantially directly toward and away from the first whereby the throat between the rolls is variable in size, pulleys on said shafts, a pair of pulleys disposed at that side of one of the shaft pulleys remote from the other shaft pulley, an endless drive belt engaged with said pulleys, said belt having a triple loop formation of which an inner loop portion lies between outer loop portions in reverse relation to the latter, said direction pulleys being engaged in said outer loop portions and the movable shaft pulley being engaged in said inner loop portion, supporting means for one of said pair of pulleys movable in the same direction as said movable journal means, the other of said pair of pulleys being rotatable on a fixed axis, and means for imparting the movements of said movable journal means to said supporting means, the loops engaging the movable pulleys being of similar form and the movable pulleys having rectilinear lines of movement extending substantially centrally of their associated loops.

5. Apparatus comprising a pair of parallel shafts, pressure or like rolls mounted on said shafts respectively and between which material is adapted to be passed for treatment, fixed journal means for one of said shafts, journal means for the other of said shafts movable substantially directly toward and away from the first whereby the throat between the rolls is variable in size, pulleys on said shafts, a pair of direction pulleys disposed at that side of the movable journal means remote from the fixed journal means, an endless drive belt engaged with said pulleys, said belt having a triple loop formation of which an inner loop portion lies between outer loop portions in reverse relation to the latter, said direction pulleys being engaged in said outer loop portions and the movable shaft pulley being engaged in said inner loop portion, supporting means for one of said pair of pulleys movable in the same direction as said movable journal means, the other of said pair of pulleys being rotatable on a fixed axis, and means for imparting the movements of said movable journal means to said supporting means, the loops engaging the movable pulleys being of similar form and the movable pulleys having rectilinear lines of movement extending substantially centrally of their associated loops.

6. Apparatus comprising a pair of parallel shafts, crusher or like rolls mounted on said shafts respectively and between which material is adapted to be passed for treatment, journal means for said shafts permitting their limited relative movement substantially directly toward and away from each other whereby the throat between the rolls is variable in size, pulleys on said shafts, a pair of direction pulleys disposed at that side of one of the shaft pulleys remote from the other shaft pulley, and an endless drive belt engaged with the shaft pulley remote from said pair of pulleys and looped back between the latter and engaged with the adjacent shaft pulley, one of said pair of pulleys being rotatable on an axis in fixed positional relation to the axis of one of said shafts and the other of said pair of pulleys being rotatable on an axis in fixed positional relation to the axis of the other of said shafts, the arrangement being such that upon movement of one of said shafts relative to the other its associated direction pulley is similarly displaced to maintain the existing tension of the belt, parallel planes tangential to the shaft pulley adjacent said direction pulleys intersecting the latter.

7. Apparatus comprising a supporting frame, a pair of rotatable crusher or like rolls journaled on said frame, one of said rolls being journaled for bodily movement relative to the other, an endless belt for driving said rolls in opposite direction, a portion of said belt having a triple loop formation in which an inner loop portion lies between outer loop portions in reverse relation to the latter, direction pulleys engaged in the outer loop portions and a pulley engaged in the inner loop portion, means for bodily moving the last-named pulley in accordance with bodily movements of the movable roll, one of said direction pulleys having a positionally fixed axis of rotation and the other being movable in dependence upon the movement of the pulley engaged in said inner loop portion whereby to maintain an existing belt tension, the loops engaging the movable pulleys being of similar form and the movable pulleys having rectilinear lines of movement extending substantially centrally of their associated loops.

8. Apparatus comprising a supporting frame, a carriage mounted on said frame for reciprocatory movements relatively thereto, a roll mounted on said frame to rotate on a fixed axis, a pulley connected to said roll to rotate therewith, an additional roll mounted on said carriage to move bodily therewith and to rotate on an axis parallel to said fixed axis, an additional pulley connected to said additional roll to rotate therewith, a direction and take-up pulley mounted to rotate on an axis parallel to the axes of said rolls, an additional direction pulley mounted to rotate on a fixed axis parallel to said first-named fixed axis and at a fixed distance therefrom, an endless belt associated with said pulleys to cause said rolls to rotate on their axes in opposite directions, said pulleys being disposed in such inter-relation as to secure at least two hundred and forty degrees of angular driving contact between the belt and the pulley connected to the roll mounted on said carriage while rotating said rolls on their axes in opposite directions, means for driving said pulleys and said belt to secure such opposite rotation of said rolls, and compression springs acting on opposite ends of said carriage to urge the said additional roll toward said first-named roll to exert pressure on material passing between said rolls and permit spreading of said rolls in accordance with the nature of such material.

9. In a double roll crusher, the combination with a supporting frame, of an abutment roll, a pressure roll, journal bearings for the opposite ends of said pressure roll, a pair of vertically spaced slide bearings for each of said journal bearings, pulleys connected to said rolls, a direction pulley mounted on said frame, a take-up pulley, a carriage for said take-up pulley and connected to one of said journal bearings to move bodily therewith, a slide bearing for said carriage and located above one of said vertically spaced slide bearings, an endless belt connected to said pulleys to drive the rolls in opposite directions, rods extending from said journal bearings through the rear portion of said frame, and compression springs between the frame and intermediate portions of said rods in position to yieldingly urge the pressure roll against the abutment roll.

10. In a double roll crusher, the combination with a supporting frame, of an abutment roll, a pressure roll, journal bearings for the ends of the shaft of the pressure roll, tie rods secured at their ends to the ends of said frame and extending through said journal bearings, slide bearings for the lower sides of said journal bearings, pulleys connected to said rolls, a direction pulley mounted on said frame, a take-up pulley, a carriage for said take-up pulley and connected to one of said journal bearings to move bodily therewith, a slide bearing for said carriage and mounted on said frame immediately above one of said tie rods, mechanism comprising springs acting on said journal bearings to yieldingly urge said pressure roll against said abutment roll, and means comprising an endless belt associated with said pulleys for rotating said rolls in opposite directions irrespective of the spacing between the axes thereof.

WALTER J. ARMSTRONG.